3,457,314
α-BROMO-CINNAMALDEHYDES AND PROCESS
FOR PREPARING THEM
Walter Siedel, Bad Soden, Taunus, and Hans Wissmann, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 243,732, Dec. 11, 1962. This application July 28, 1964, Ser. No. 385,793
Claims priority, application Germany, Dec. 18, 1961, F 35,586
Int. Cl. C07c 47/48, 45/00; A61k 27/00
U.S. Cl. 260—599     1 Claim

ABSTRACT OF THE DISCLOSURE

Novel alpha-bromo-cinnamaldehydes are prepared by reacting halogenated cinnamaldehyde derivatives with bromine in non-aqueous solvents.

---

This application is a continuation-in-part of copending application Ser. No. 243,732, filed Dec. 11, 1962 and now abandoned.

The present invention provides new aldehydes of the general formula

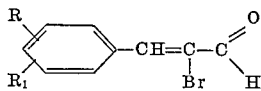

in which R stands for chlorine, bromine or nitro, and $R_1$ stands for chlorine or bromine which in comparison with known compounds of comparable chemical structure are characterized by a considerably better fungistatic and a simultaneous bacteriostatic action.

The present invention likewise comprises bacteriostatically and/or fungistatically active preparations containing the compounds of the above-mentioned formula in solid, semi-solid or dilute form in conjunction with the usual auxiliaries, carrier substance and/or stabilizers. The present invention likewise relates to the preparation of aldehydes of the general formula

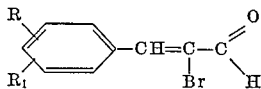

in which R stands for chlorine, bromine or nitro and $R_1$ stands for chlorine or bromine which are obtained according to processes generally used for the synthesis of such aldehydes.

An advantageous method of preparing the new aldehydes in good yields consists in treating cinnamaldehydes of the general formula

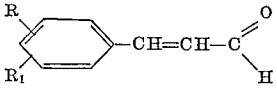

in which R and $R_1$ have the meanings given above, in practically non-aqueous solvents with an equimolar quantity of bromine and splitting off the hydrogen bromide of the bromine addition products so obtained by means of alkali metal acetates.

As starting products may be used according to the present invention: 2,4-dichloro-cinnamaldehyde, 2,6-dichloro-cinnamaldehyde, 2,4-dibromo-cinnamaldehyde, 2-chloro-4-bromo-cinnamaldehyde, 3-chloro-4-bromo-cinnamaldehyde, 2,5-dichloro-cinnamaldehyde, 2,5-dibromo-cinnamaldehyde, 3,4-dichloro-cinnamaldehyde, 4-chloro-3-nitro-cinnamaldehyde.

For the addition of bromine non-aqueous solvents may be used, for example: carbon disulfide, chloroform, glacial acetic acid and perhalogenated aliphatic hydrocarbons ($C_1$–$C_3$). The reaction temperature can be chosen within the limits of 0–50° C.; it is advantageous to operate at temperatures in the range from 0 to 35° C.

The subsequent reaction with alkali metal acetate which is preferably carried out with potassium acetate can be performed with the addition of a lower aliphatic alcohol ($C_1$–$C_3$) an preferably at the boiling temperature of the mixture. The reaction product can be isolated according to various methods, for example, by distilling off the solvent or by cooling the reaction mixture.

The products of the invention are highly active fungistatic substances which, in comparison with known compounds of comparable chemical structure are characterized by a considerably improved activity. As can be seen from the table the α-bromo-2,4-dichloro-cinnamaldehyde exhibits a distinctly superior action on cutaneous fungi, thrush fungi and rot fungi, when being compared with similar known compounds. The figures mentioned indicate in γ/ml. the concentrations of the various compounds tested, which concentrations were sufficient for completely inhibiting, within a test period of about 18 days, the growth of the individually registered fungi on solid culture media.

As bacteriostatically and/or fungistatically active preparations there may be used, for instance, solutions, ointments, soaps or powders, in which the compounds are incorporated as active ingredients together with the usual carrier substances and adjuvants, such as, for instance, water, vegetable or animal fats, waxes, tragacanth, gelatin, magnesium carbonate, caolin, talc, zinc oxide, starch and the like.

Ointments and powders may preferably contain between 0.5 and 10% of the products of the invention. As solvents there are preferably applied mixtures of water/alcohol, water/dimethylformamide or water/dimethylsulfoxide. For mixtures of water and alcohols, low molecular alcohols are preferred. Non-aqueous organic solvents, particularly low-molecular alcohols, dimethylformamide and dimethylsulfoxyde can also be used as solvents. The solutions may contain up to 35% of the aldehyde.

The following examples serve to illustrate the invention, but they are not intended to limit it thereto.

EXAMPLE 1

α-Bromo-2,4-dichloro-cinnamaldehyde

A solution of 23 grams of bromine in 15 cc. of carbon tetrachloride is added dropwise at 0° C. within the course of 5 hours at 0° C. and with the the exclusion of moisture to a suspension of 29 grams of 2,4-dichloro-cinnamaldehyde dans 600 cc. of dry carbon tetrachloride, whereby the 2,4-dichloro-cinnamaldehyde is slowly dissolved. After having added the bromine solution, stirring is continued at 0° C. for a further 90 minutes, then 15 grams of potassium acetate and 65 cc. of absolute ethanol are added thereto. Subsequently the reaction mixture is heated at the boil for a further 30 minutes. The precipitated potassium bromide is filtered off with suction at 0° C. After being concentrated in vacuo, the α-bromo-2,4-dichloro-cinnamaldehyde crystallizes from the solution and is recrystallized from ether/petroleum ether. The aldehyde melts at 94 to 96° C. The yield is 29.5 grams (72% of the theory).

When starting from 2,6-dichloro-cinnamaldehyde there is obtained in an analogous manner the α-bromo-2,6-dichloro-cinnamaldehyde melting at 131–132° C., and when starting from 3-chloro-4-bromo-cinnamaldehyde there is obtained the α-bromo-3-chloro-4-bromo-cinnamaldehyde melting at 142–143° C., and when starting from 4-chloro-3-nitro-cinnamaldehyde, there is obtained the α-bromo-4-chloro-3-nitro-cinnamaldehyde melting at 103–106° C.

TABLE.—COMPARISON OF THE ANTIMYCOTIC PROPERTIES

[The concentrations of the preparations indicated in the following table in γ/ml. were sufficient for completely inhibiting the growth of the fungi listed below (test period 18 days, solid culture medium)]

| | Cutaneous fungi | | | Thrush | | | Rot fungi | |
|---|---|---|---|---|---|---|---|---|
| | Microspron gypseum | Trichophyton rubrum | Trichophyton tonsurans | Trichophyton epilans | Candida albicans 504 | Candida albicans Y 1200 | Aspergillus niger | Trichoderma viside |
| α-Bromo-p-cyano-cinnamaldehyde (cf. German Patent Application laid open to public inspection No. 1,103,-318) | 62 | 31 | 31 | 31 | 500 | 250 | 1,000 | 250 |
| α-Bromo-p-nitro-cinnamalehyde (cf. Indian Journal of Pharmacy 18 (1956) 10, page 396) | 16 | 16 | 16 | 16 | 500 | 250 | 1,000 | 1,000 |
| α-Bromo-2,4-dichloro-cinnamaldehyde | 4 | 4 | 4 | 4 | 125 | 62 | 62 | 125 |

We claim:
1. α-Bromo-2,4-dichloro-cinnamaldehyde.

References Cited

UNITED STATES PATENTS

| | | | |
|---|---|---|---|
| 2,529,186 | 11/1950 | Richmond | 260—599 |
| 2,628,256 | 2/1953 | Campbell | 260—599 |
| 2,721,826 | 10/1955 | Cronheim | 167—65 |
| 2,744,852 | 5/1956 | Goodman. | |
| 2,757,090 | 7/1956 | Neugebauer. | |

FOREIGN PATENTS 343,097   4/1959   Japan.

LEON ZITVER, Primary Examiner

R. H. LILES, Assistant Examiner

U.S. Cl. X.R.

260—999; 424—333